July 19, 1938.  A. M. BANK  2,124,048
UPHOLSTERY CONSTRUCTION
Filed Feb. 1, 1937   2 Sheets-Sheet 2
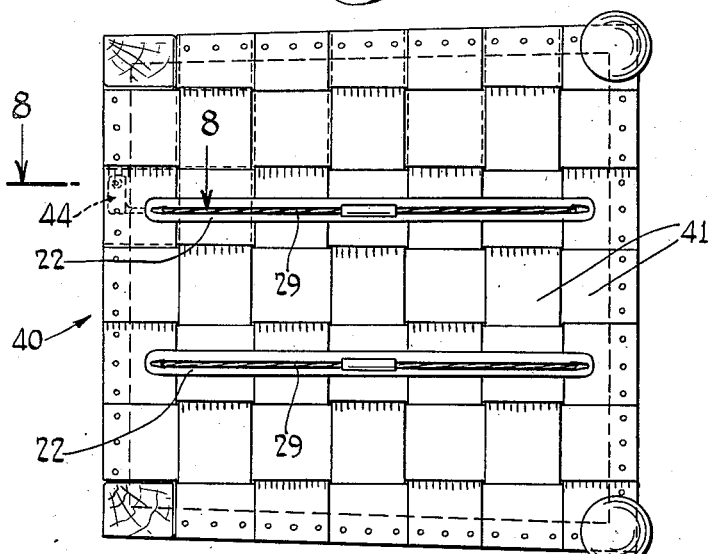
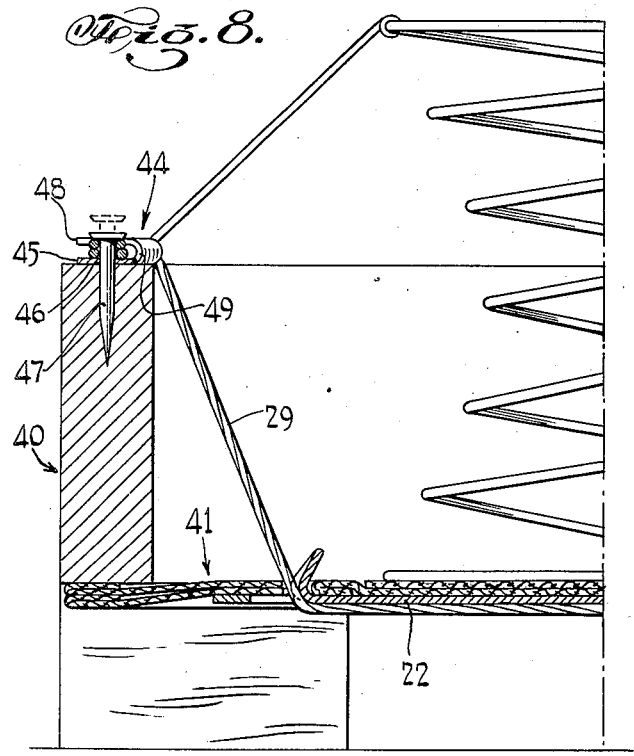
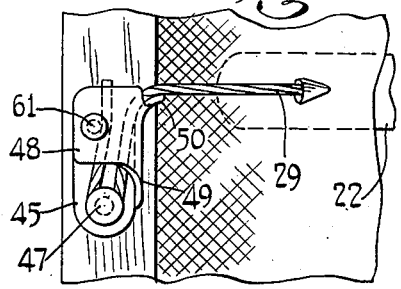
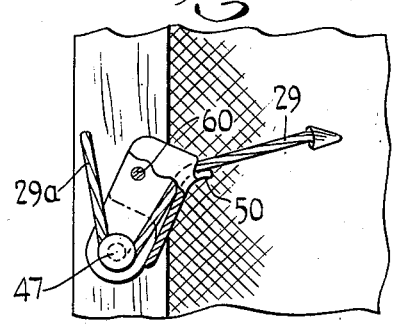
INVENTOR
Albert M. Bank
BY
Judah B. Felshin
ATTORNEY Patented July 19, 1938

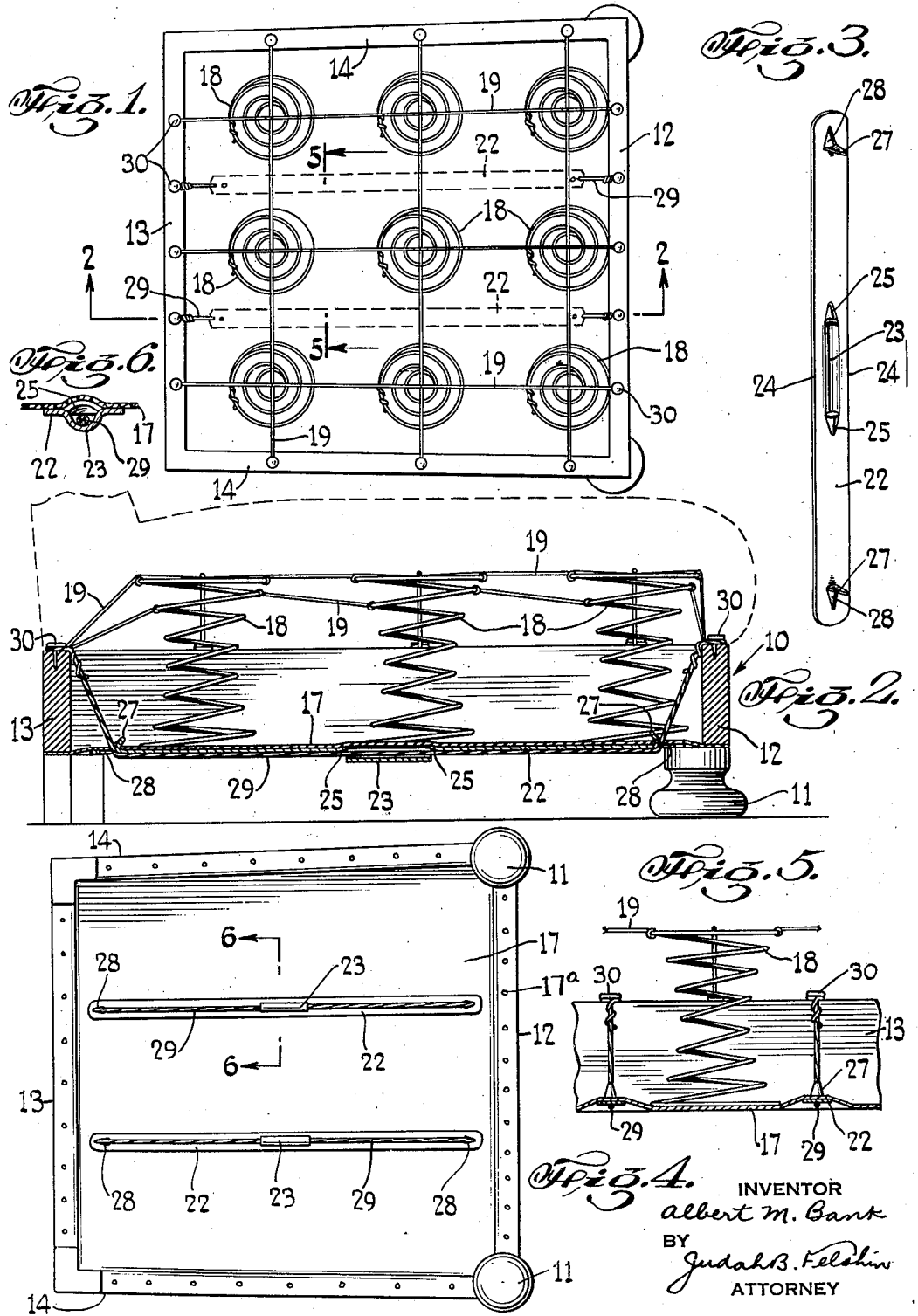

2,124,048

UNITED STATES PATENT OFFICE 2,124,048

UPHOLSTERY CONSTRUCTION

Albert M. Bank, Jersey City, N. J., assignor to Sylvia Bank, Jersey City, N. J.

Application February 1, 1937, Serial No. 123,395

11 Claims. (Cl. 155—179)

This invention relates to upholstery construction. It is particularly directed to an auxiliary support for the webbing of upholstered furniture.

An object of this invention is to provide in upholstery construction of the character described, an auxiliary support for the webbing, comprising a flexible cable attached at its ends to the frame and having an intermediate portion passing beneath the webbing, and an elongated member interposed between said portion and the webbing serving as a washer and preventing friction between the cable and the webbing upon flexing of the webbing, the washer member furthermore being provided with prongs whereby the same may be attached to the webbing so that the same need not be held while the cable is being attached to the frame.

Another object of this invention is to provide in upholstery construction of the character described, an improved take-up member for attaching one end of the cable to the frame.

A further object of this invention is to provide upholstery construction of the character described, which shall be relatively inexpensive to manufacture and easy to incorporate into a chair seat or back, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a top plan view of a seat provided with an auxiliary support for a one-piece fabric webbing, embodying the invention;

Fig. 2 is a cross-sectional view taken on line 2—2 of Fig. 1;

Fig. 3 is a perspective view of the strip engaging the underside of the webbing and forming part of my invention;

Fig. 4 is a bottom plan view of a seat upholstered in accordance with my invention;

Fig. 5 is a cross-sectional view taken on line 5—5 of Fig. 1;

Fig. 6 is an enlarged, cross-sectional view taken on line 6—6 of Fig. 4;

Fig. 7 is a bottom plan view of the frame provided with strip webbing and having an auxiliary support for said webbing, embodying the invention and illustrating my improved take-up attachment device for one end of the cable;

Fig. 8 is a cross-sectional view taken on line 8—8 of Fig. 7;

Fig. 9 is a top plan view of the structure shown in Fig. 8; and

Fig. 10 is a view similar to Fig. 9, but illustrating the method of taking up the cable.

Referring now in detail to the drawings, 10 designates a seat frame for a chair. The frame 10 is supported on legs 11 and has vertical front wall 12, rear wall 13 and side walls 14. Attached to the underedges of the frame is a one-piece fabric, textile webbing 17, for example, burlap, or the like material. The webbing 17 may be attached to the frame by tacks, nails, or other suitable fastening devices 17a.

Mounted on the webbing are a plurality of spaced rows of usual coil foundation springs 18 attached together and to the frame by tie cords 19 in the well known manner. The foundation springs may be of the hour glass shape and attached to the webbing in any suitable manner.

In accordance with my invention, there is provided an auxiliary support for the webbing 17. The same may comprise a plurality of strips 22 contacting the underside of the webbing 17 and located between adjacent rows of springs 18 and perpendicular to the front and rear walls 12 and 13 and supported by the frame in the manner described hereinafter.

Each strip 22 is preferably flat, thin, elongated and of uniform width; and made of flexible, bendable or resilient metal, such as steel. At the central portion thereof, the strip 22 is provided with a longitudinal depressed channel 23, preferably of curved cross section. The channel 23 is preferably parallel to the parallel side edges 24 of the strip 22. The portions of the strip 22 adjacent the outer ends of the channel are preferably part conical, being curved upwardly as at 25, oppositely to the channel, whereby to provide a substantially circular opening at each end of the channel.

Adjacent each end of the channel is a struck-up triangular or pointed prong 27 stamped or struck upwardly and inwardly from the metal of the strip, forming triangular, longitudinally extending openings 28 at each end of the strip. Each prong 27 may be somewhat curved in cross section, inwardly, for the purpose hereinafter appearing.

In applying the strips to the webbing, each strip is pushed upwardly against the underside of the webbing, whereby the prongs 27 pierce the webbing. The prongs are then bent inwardly as illustrated in Fig. 2, to hold the strips in the webbing. A rope, cord or cable 29, of any suitable material, is then passed along the underside of each strip and through the channel 23. The ends of the cable are passed through the openings 28 at the ends of the strip and through the openings formed in the webbing by the pierced prongs. The outer ends of the cable are preferably attached to nails, staples or other fastening devices 30 on the top edge of the front and rear walls 12 and 13. The cables may be tensioned to any desired degree upon attachment to the fastening devices 30.

As shown in the drawings, the strips 22 are less in length than the distance between the front and rear walls of the frame. The auxiliary supports may be arranged in any suitable manner on the frame, depending upon the shape of the frame and the location of the foundation springs.

Although the invention is illustrated in the drawings applied to the seat of a chair, it will be understood that my auxiliary support may be incorporated with seats or backs of love seats, sofas or other cushioned upholstered furniture.

The strips 22 may flex with the webbing and yet serve to hold apart the portions of the cable passing through the webbing to prevent tearing the webbing.

The pieces of cable may be easily run through the depressed channel when assembling the same with strips, after the strips are applied to the webbing.

The members 22 act as washers being attached to the webbing and interposed between the cable and the webbing and preventing friction between the cable and the webbing upon flexing of the webbing.

My improved auxiliary support may be applied to upholstered chairs, seats or backs provided with strip webbing. In Figs. 7, 8 and 9 there is disclosed a frame 40 provided with usual interwoven strip webbing 41 attached directly to the frame. Attached to the strip webbing are a pair of elongated washer members 22 similar to the member 22 shown in Fig. 3 of the drawings. Cables 29 are applied in the same manner as in Figs. 1 to 5 of the drawings, except that one end of the cable 29 may be attached to the frame 40 by my improved take-up member 44 as shown in Figs. 7, 8, 9 and 10. The take-up and attachment member 44 is channel-shaped and has a portion 45 contacting the upper edge of the frame wall and provided with an opening 46 receiving a nail 47. The member 44 also has a portion 48 parallel to the portion 45 and connected thereto by a curved portion 49. One end of the portion 48 is cut away, however, to expose the nail 47. At one end of the member 44 is an outwardly curved lip 50 extending from the curved portion 49. The portions 45 and 48 have registering nail openings 60 spaced from the nail opening 46.

In attaching the cable 29 to the frame, one end of the cable is passed through the channel of the member 44 and wound around the nail 47. The nail 47 is first driven through the opening 46 into the top of the frame to the dotted line position shown in Fig. 8. The cable 29 is then wound around the nail and the nail driven further into the frame. The member 44 is then rotated about the nail 47 from the position shown in Fig. 10 to the position shown in Fig. 9 to take up or tighten the cable. The outer end 29a of the cable is then pushed into the channel and a second nail 61 driven through the nail opening 60. The cable is thus firmly attached to the frame and the rotation of the member 44 about the nail 47 serves to apply a desired degree of tension to the cable.

It will now be understood that my improved auxiliary support may be applied to either one piece or strip webbing attached directly to the underside of the frame.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In upholstery construction, a frame, flexible webbing connected to the bottom of the frame, a flexible member having the ends thereof secured to opposite sides of the frame at a substantial distance above said webbing, and having an intermediate portion extending beneath an intermediate portion of said webbing, and means, spaced from the frame, adjacent said webbing and coextensive with said intermediate portion of said webbing, serving as a spreader in the bight of said flexible member.

2. In upholstery construction, a frame, flexible webbing connected to the bottom of the frame, a flexible member having the ends thereof secured to opposite sides of the frame at a substantial distance above said webbing, and having an intermediate portion extending beneath an intermediate portion of said webbing, and means, spaced from the frame, adjacent said webbing and coextensive with said intermediate portion of said webbing, serving as a spreader in the bight of said flexible member, said means comprising a member having an integral portion engaging said webbing and attaching said last mentioned member to said webbing.

3. In upholstery construction, a frame, webbing attached at all of its margins to the underedge of said frame, an elongated member engaging the underside of said webbing and having the ends thereof spaced inwardly of the walls of said frame, a cable having a portion engaging the underside of and extending longitudinally of said member and passing through openings in said webbing, the outer ends of said cable being attached to the upper edges of said frame.

4. In upholstery construction, a frame, webbing attached at all of its margins to the underedge of said frame, an elongated member engaging the underside of said webbing and having the ends thereof spaced inwardly of the walls of said frame, a cable having a portion engaging the underside of and extending longitudinally of said member and passing through openings in said webbing, the outer ends of said cable being attached to the upper edges of said frame, said member having a depressed portion receiving said cable.

5. In upholstery construction, a frame, fabric webbing attached at its edges directly to the frame, on elongated strip engaging the underside of said webbing and having prongs adjacent the ends thereof piercing said webbing, and a flexible member having a portion engaging the underside of said strip and extending longitudinally of said strip, said flexible member extending through openings in said webbing adjacent the outer ends of said strip and being attached to upper edge portions of said frame.

6. In upholstery construction, a frame, fabric webbing attached at its edges directly to the frame, an elongated strip engaging the underside of said webbing and having prongs adjacent the ends thereof piercing said webbing, and a flexible member having a portion engaging the underside of said strip and extending longitudinally of said strip, said flexible member extending through openings in said webbing adjacent the outer ends of said strip and being attached to upper edge portions of said frame, said strip having openings adjacent said prongs through which the cable passes.

7. In upholstery construction, a frame, fabric webbing attached at its edges directly to the frame, an elongated strip engaging the underside of said webbing and having prongs adjacent the ends thereof piercing said webbing, and a flexible member having a portion engaging the underside of said strip and extending longitudinally of said strip, said flexible member extending through openings in said webbing adjacent the outer ends of said strip and being attached to upper edge portions of said frame, said strip having a longitudinal depressed channel receiving said flexible member.

8. In upholstery construction, a frame, strip webbing attached to the underedge of said frame, an elongated member engaging the underside of said webbing and having the ends thereof spaced inwardly of the walls of said frame, a cable having a portion engaging the underside of and extending longitudinally of said member and passing through openings in said webbing, the outer ends of said cable being attached to the upper edges of said frame, said member being disposed within the bight of the cable, and having a longitudinal depressed portion receiving said cable, and prongs on said member piercing said webbing.

9. In upholstery construction, a frame, strip webbing attached to the underedge of the frame, an elongated member engaging the underside of the webbing and having the ends thereof spaced inwardly of the walls of the frame, a cable having an intermediate portion engaging the underside of said member and extending longitudinally thereof and passing through the webbing, the outer ends of said cable being attached to the upper edges of the frame, said elongated member being disposed within the bight of said cable and serving as a spreader in the bight of the cable.

10. In upholstery construction, a frame, flexible webbing connected to the bottom of said frame, a flexible member having the ends thereof secured to opposite sides of the frame at a substantial distance above said webbing, and having an intermediate portion extending beneath an intermediate portion of said webbing, and a member disposed between said intermediate portion of said webbing and said intermediate portion of said flexible member, and spaced from the frame, serving as a spreader in the bight of said flexible member.

11. In upholstery construction, a frame, flexible webbing connected to the bottom of said frame, a flexible member having the ends thereof secured to opposite sides of the frame at a substantial distance above said webbing, and having an intermediate portion extending beneath an intermediate portion of said webbing, and a member disposed between said intermediate portion of said webbing and said intermediate portion of said flexible member, and spaced from the frame, serving as a spreader in the bight of said flexible member, said member engaging the ends of the intermediate portion of said flexible member at spaced points where said flexible member passes through said webbing, said spreader member having means located between said points of engagement, to hold said intermediate portion of said flexible member against lateral movement relative to said spreader member.

ALBERT M. BANK.